Feb. 18, 1964          R. L. McILVAINE          3,121,593
PNEUMATIC MATERIAL HANDLING APPARATUS
Filed Feb. 23, 1961

INVENTOR.
ROBERT L. McILVAINE
BY MASON, KOLEHMAINEN,
RATHBURN & WYSS

ATTORNEYS

United States Patent Office 3,121,593
Patented Feb. 18, 1964

3,121,593
PNEUMATIC MATERIAL HANDLING APPARATUS
Robert L. McIlvaine, Winnetka, Ill., assignor to Herbert Simpson Corporation, Chicago, Ill., a corporation of Illinois
Filed Feb. 23, 1961, Ser. No. 91,011
2 Claims. (Cl. 302—53)

The present invention relates to pneumatic material handling apparatus especially adapted for conveying granular, powdered, pulverized and like materials, and, more particularly, to improved means for initiating and maintaining the flow of the granular material.

Pneumatic material handling apparatus is known wherein granular material is conveyed from a storage chamber to its place of use, for example, in the foundry field it is necessary that granular material such as sand be conveyed or transported from a storage bin to a molding apparatus before a molding operation and then to be conveyed or transported from the molding apparatus to suitable sand reclaiming equipment. Such pneumatic handling equipment conventionally includes a container for the material which forms the storage compartment and which is adapted to be filled to a predetermined level with the granular material. The pressure container has a discharge or transport outlet at the bottom thereof and is further arranged with means to admit fluid under pressure, such as steam or air, into the container and the transport outlet to aerate and to provide a fluid suspension of the material, and to place the material in the container under pressure and discharge it through the transport outlet. It is customary to transport the material discharged from the container to a depository or place of use for the material through a material transporter conduit. One such material handling apparatus is illustrated and claimed in my copending application filed jointly with John H. Kaufman and and Axel G. Granath, Serial No. 770,636, filed October 30, 1958, now Patent No. 3,034,835, May 15, 1962.

One difficulty which has been experienced in the pneumatic handling equipment is that upon initial starting of the transporting operation, the materal in the transporter chambers at rest and material at rest flows downwardly by gravity from the chamber into the transporter conduit as determined by the angle of repose of the material. When fluid under pressure is introduced into the chamber to fluidize the mass of material the pressure in the chamber builds up and air escapes through the permeable material downwardly into the transporter conduit so that when the pressure has reached a certain point the material begins to flow in the transporter conduit and then the whole mass flows in a more-or-less fluid flow. However, particular difficulty is encountered when the material is dense and the air entering the chamber cannot readily escape through the material lying in the transporter conduit. Such a condition would exist, for example, in the conveying of dry foundry sand. In such material of low permeability the initial fluidizing action of the air entering the transporter conduit lessens and may stop completely before the pressure in the chamber has reached sufficient proportions to start moving the inert material lying in the transporter conduit. Therefore, the effect of the fluidizing nozzles is nullified.

It is, therefore, desirable that a pneumatic material handling apparatus be provided which is not subject to these disadvantages, and it is an object of the present invention to provide an improved material handling apparatus which overcomes the aforementioned difficulties.

Another object of the present invention is to provide an improved pneumatic material handling apparatus.

A further object of the present invention is to provide an improved pneumatic material handling apparatus wherein the material is made to flow from a rest state in a positive manner.

The above and other objects of the invention are realized, in accordance with the present invention, in a pneumatic conveyor system having a supporting structure and including a lower conical section, forming a chamber which is adapted to be at least partially filled with granular material to a predetermined level thereby forming a material containing portion and an air circulation portion above the material containing portion in the chamber. Means are provided which communicate with the chamber and which introduce a medium under pressure into the chamber to form a fluid suspension of the material. The material in suspension is discharged through a transport conduit connected to the apex of the conical section. The granular material in the chamber will flow a certain distance by gravity into the transport conduit as determined by the angle of repose of the material. In order to aid in starting the flow of material from a rest position, according to the present invention, there is provided a bypass conduit communicating from the top of the chamber in the air circulation portion to the transport conduit discharging just above the level of the granular material in the transport conduit. In operation, the fluid entering the chamber tends to fluidize the mass of granular material and a portion of this material escapes through the bypass conduit to blow away the small mass of material below it and thus to start the material flowing from the chamber by gravity, as well as by the force of fluid pressure. As a result, the material flows in a steady fluid flow rather than in heavy slugs as might otherwise result without the bypass conduit.

Other objects and advantages of the present invention will become apparent from the following description of illustrative embodiments thereof, in the course of which reference is to be had to the accompanying drawings, wherein.

Figure 1:
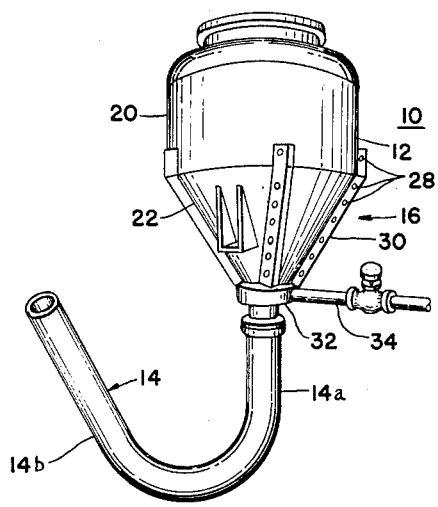
FIG. 1 is a perspective view of an improved pneumatic conveyor apparatus according to the present invention.
Figure 3:
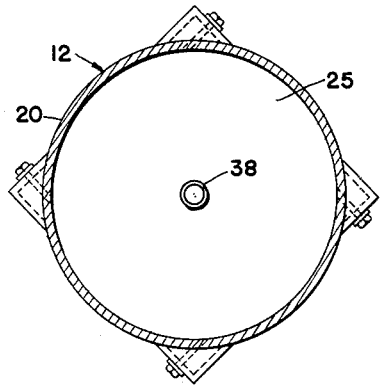
FIG. 3 is a plan view, in section, of the pneumatic conveyor apparatus taken along line 3—3 of FIG. 2.
Figure 2:
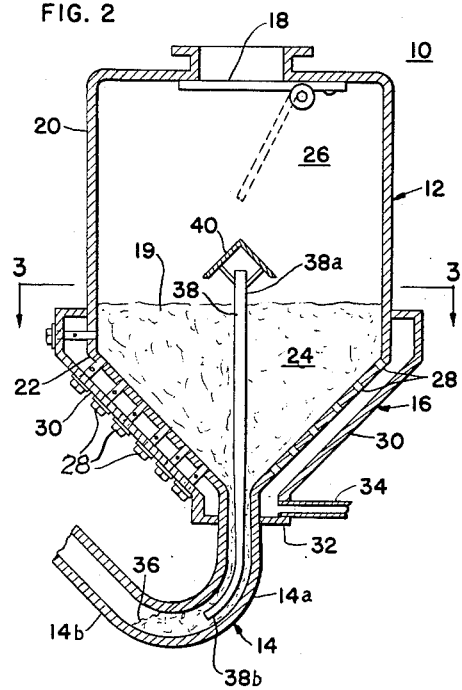
FIG. 2 is a sectional elevational view of the improved pneumatic conveyor apparatus of FIG. 1.

Referring now to the drawings, and particularly to the embodiment of FIGS. 1 to 3, there is illustrated a portion of a pneumatic conveyor apparatus 10 which may be used in a foundry for transporting foundry sand and other granular materials, finely divided solids, comminuted matter and the like between spaced apart stations within the foundry. The conveyor apparatus is a substantially closed pneumatic system and comprises a transporter chamber 12 into which foundry sand is gravity fed and a transporter conduit 14 for transporting the foundry sand to either single or multiple stations located either above or below the transporter chamber 12. The transporter 12 embodies a plurality of spaced jet nozzle means, shown generally at 16, for introducing into the transporter chamber 12 a fluid under pressure, for example, compressed air, thereby to accelerate the flow of sand through the transporter chamber and into the transporter conduit 14.

In order to provide for filling the chamber 12 with granular material the chamber 12 is provided with a hinged door 18 into which a charge of granular material 19 may be fed either by gravity or by suitable conveyor equipment. After the transporter chamber 12 has been filled with granular material, the door 18 is closed. The transporter chamber 12 includes a cylindrical portion 20 closed at its lower end by a conical portion 22. As best seen in FIG. 2, the transporter chamber 12 is filled so that the granular material 19 does not rise above a certain level in the chamber 12; in this manner the chamber 12 is divided into a material containing portion 24 and an air circulation portion 26 above the material containing portion 24.

In order to provide a predetermined pattern of air stream within the chamber 12 to cause a fluid suspension of the granular material within the chamber 12, there is provided a plurality of jet means 28 located at different levels in the wall of the transporter 12 and communicating with trunk manifolds 30 which are in communication with a main manifold 32. Fluid under pressure can be supplied to the main manifold 32 through a fluid supply inlet conduit 34. As more fully described in my above referenced jointly filed pending application, the jet means are effective to suspend the granular material 19 in the fluid and to cause the suspension to move down the transporter conduit 14.

In order to provide for transfer of the granular material 19 from the transporter chamber 12 to any desired location, the transporter conduit 14 communicates with the apex of the conical section 22 and has a portion 14a extending vertically downward therefrom, and a portion 14b which may extend in any direction to the desired delivery station. The granular material 19 in the material containing portion 24 of the chamber 12 will flow by gravity downwardly through the vertically extending portion 14a of the transport conduit 14 and will stop in the delivery portion 14b thereof as determined by the angle of repose indicated as 36.

In order to initiate the movement of material 25 through the transporter conduit 14 when the fluid pressure is applied to conduit 34 and therefore to the chamber 12 through the nozzles 28, there is provided a bypass conduit 38 which communicates with the chamber 12 and with the transporter conduit 14 discharging at a point above the bottom surface of the granular material 19, identified as 36 in FIG. 2. According to the embodiment of FIGS. 1, 2 and 3, the bypass conduit 38 comprises a tube concentrically positioned within the chamber 12 and extending concentrically through the vertically extending portion 14a of the transporter conduit 14 and discharging just above the surface 36 of the material. In order to prevent granular material 19 from entering the bypass conduit 38, there is provided a baffle or shield 40 spaced vertically above the inlet end 38a of the conduit 38.

In operation, the material to be conveyed is loaded into the chamber 12 through the door 18 so as to partially fill the chamber 12 and, specifically, to fill the material containing portion 24 thereof and to provide the air circulation portion 26 above the material containing portion 24. The door 18 is then closed and compressed fluid, such as air, is introduced into the chamber 12 through the nozzle means 28. The air enters at high velocity and tends to fluidize the mass of material 19. As the pressure builds up within the chamber 12, some air escapes through an inlet end 38a of the bypass conduit 38 and passes downwardly discharging through an outlet end 38b just above the bottom surface 36 of the material 19 in the transporter conduit 14, thereby blowing away the small mass of material which is below the bypass conduit 38 and thus starting the material flowing from the chamber 12 by gravity as well as by the first of the air pressure. As a result, the sand moves in a steady flow through the transporter apparatus 10.

Figure 4:
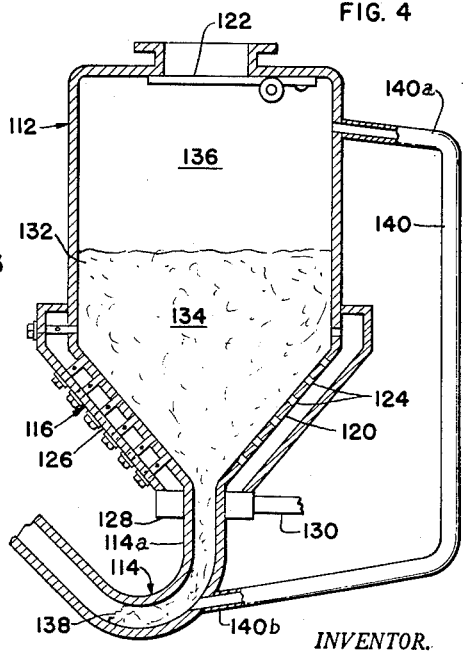
FIG. 4 is a sectional elevational view of a pneumatic conveyor apparatus according to another embodiment of the present invention.

FIG. 4 illustrates an embodiment of the present invention wherein the bypass conduit between the transporter conduit and the transporter chamber is located externally of these members. Specifically, referring to the embodiment of FIG. 4, there is provided a material conveying apparatus illustrated generally at 100 and comprising a transporter chamber 112 and a transporter conduit 114.

The transporter chamber 112 is provided with a fluid supply means 116. The transporter chamber 112 includes an upper cylindrical portion 118 and a lower conical portion 120 and is additionally provided with a door 122 to provide for filling the chamber 112 with granular material.

In order to cause a fluid suspension of the granular material, the fluid supply means 116 includes a plurality of jet means 124 communicating with a plurality of trunk manifolds 126 extending from a main manifold 128. A fluid inlet line 130 is connected to the main manifold 128 to provide a source of fluid. The chamber 112 may be filled with a charge of granular material 132 through the door 122 so that the granular material 132 partly fills the chamber 12, forming a material containing portion 134 and an air circulation portion 136 thereabove. As heretofore described, the granular material 134 flows by gravity from the chamber 112 through an inlet end 114a of the transporter conduit 114 to assume a lower surface 138 as determined by the angle of repose of the particular granular material 134.

According to the present invention, the bypass conduit which communicates between the chamber 112 and the transporter conduit 114 includes a bypass conduit 140 positioned externally of the chamber 112 and the conduit 114 and having an inlet end 140a communicating with the chamber 112 above the granular material 132 in the air circulation portion 136 of the chamber 112, the lower end 140b of the bypass conduit 140 communicates with the transporter conduit 114 at a point slightly above the lower surface 138 of the granular material 132.

In operation, the conveyor apparatus 100 works in the same manner as the embodiment of FIGS. 1, 2 and 3. Specifically, air under pressure is supplied through the jets 124 so as to cause a fluidizing action of the granular material 132 within the chamber 112. At the same time, a portion of the air under pressure in the air circulation portion 136 of the chamber 112 is bypassed through the bypass conduit 140 and is discharged in the discharge conduit 114 just above the lower surface 138 of the granular material 132. This bypass of air is effective to break away the small mass of sand ahead of it in the transporter conduit 114 and thus to start the sand flowing from the chamber 112 by gravity, as well as by the force of the air pressure.

While the present invention has been described in connection with particular embodiments of the invention, it will be understood that various modifications may be made by those skilled in the art. It is intended in the appended claims to cover all such modifications as fall within the true spirit and scope of this invention.

What is claimed as new and is desired to be secured by Letters Patent of the United State is:

1. In a pneumatic conveyor system, a closed supporting structure including a cylindrical upper section and a lower conical section and forming a chamber adapted to receive granular material to a certain level, inlet means for admitting said granular material into said chamber, said chamber forming a material containing portion and an air circulation portion, a material transport conduit including a first portion extending downwardly from said conical section and a second portion inclined at an angle to the vertical which will prevent gravity flow through said second portion so that any material in said material containing portion will flow by gravity through said first portion into at least a portion of said second portion to a level forming a lower surface of material in said second portion as determined by the angle of repose of said material, means communicating with said chamber for introducing a medium under pressure into said chamber to form a fluid suspension of said material, and bypass conduit means including a conduit extending from said air circulation portion concentrically within said material transport conduit to a point above the lower surface of said material.

2. In a pneumatic conveyor system, supporting structure including a lower conical section and forming a chamber adapted to receive granular material to a certain level so as to form a material containing portion and an air circulation portion, a material transport conduit connected to the apex of said conical section and having a first portion extending vertically downwardly therefrom and a second portion inclined at an angle to the vertical which will prevent gravity flow through said second portion so that any material in said material containing portion will flow through said first portion by gravity into at least a part of said second portion to a level as determined by the angle of repose of said material, means communicating with said chamber for introducing a medium under pressure into said chamber to form a fluid suspension of said material, and bypass conduit means communicating between said air circulation portion and said second portion above the last-mentioned level and including a conduit concentrically positioned within said supporting structure and said material transport conduit.

References Cited in the file of this patent

UNITED STATES PATENTS

| | | |
|---|---|---|
| 1,889,480 | Kelley | Nov. 29, 1932 |
| 2,915,338 | Loomis | Dec. 1, 1959 |
| 2,924,489 | Beckmann | Feb. 9, 1960 |